United States Patent [19]

Suga et al.

[11] Patent Number: 5,117,785

[45] Date of Patent: Jun. 2, 1992

[54] VALVE TIMING CONTROL DEVICE FOR INTERNAL COMBUSTION ENGINE

[75] Inventors: Seiji Suga; Hideaki Onishi, both of Kanagawa, Japan

[73] Assignee: Atsugi Unisia Corporation, Kanagawa, Japan

[21] Appl. No.: 605,536

[22] Filed: Oct. 29, 1990

[30] Foreign Application Priority Data

| Oct. 30, 1989 [JP] | Japan | 1-282452 |
| Jun. 28, 1990 [JP] | Japan | 2-171019 |
| Aug. 31, 1990 [JP] | Japan | 2-231205 |

[51] Int. Cl.⁵ ............................. F01L 1/34
[52] U.S. Cl. ......................... 123/90.17; 123/90.31; 464/2
[58] Field of Search .......... 123/90.15, 90.17, 90.31; 464/2

[56] References Cited

U.S. PATENT DOCUMENTS

| 4,535,731 | 8/1985 | Banfi | 123/90.15 |
| 4,601,266 | 7/1986 | Oldfield et al. | 123/90.15 |
| 4,627,825 | 12/1986 | Bruss et al. | 123/90.17 |
| 4,858,572 | 8/1989 | Shirai et al. | 123/90.15 |
| 4,895,113 | 1/1990 | Speier et al. | 123/90.17 |
| 4,903,650 | 2/1990 | Ohlendorf et al. | 123/90.17 |

FOREIGN PATENT DOCUMENTS

| 3701867 | 8/1988 | Fed. Rep. of Germany . |
| 2217812 | 11/1989 | United Kingdom | 123/90.17 |

*Primary Examiner*—E. Rollins Cross
*Assistant Examiner*—Weilun Lo
*Attorney, Agent, or Firm*—Bachman & LaPointe

[57] ABSTRACT

A valve timing control device for an internal combustion engine includes an intermediate rotary component disposed between an input component which is driven in synchronism with an engine revolution, and a cam drive component which is rigidly connected to a camshaft. The intermediate component is variable of positions relative to the input and cam drive components in order to adjust phase relationship between the input component and the cam drive component for setting valve timing at optimal timing relative to engine revolution cycle. The device includes a hydraulic means which selectively locks the intermediate component at a selected position where optimal phase relationship relative to the engine driving condition is established.

12 Claims, 9 Drawing Sheets

VALVE TIMING CONTROL DEVICE FOR INTERNAL COMBUSTION ENGINE

BACKGROUND OF THE INVENTION

1. Field of the Invention

The present invention relates generally to a valve timing control device for an internal combustion chamber for adjusting phase relationship between an engine revolution synchronous component, such as a timing sprocket or pulley connected to an engine output shaft via a timing chain or timing belt, and a cam drive component, such as a camshaft, and whereby adjusting opening timing of an intake valve and/or an exhaust valve. More specifically, the invention relates to a valve timing control device which has simplified construction with reduction of frictional element to resolve problems of wearing or secular variation with maintaining satisfactory valve timing adjusting performance.

2. Description of the Background Art

In the modern automotive technologies, it is important to achieve both of high driving performance and fuel economy. High engine performance is especially important at high engine load range. On the other hand, at low engine load range, fuel economy will be regarded as a more important factor than the engine performance. Furthermore, in the recent days, anti-polution is becoming a more important factor for avoiding contamination of the atmosphere. Fuel consumption and purity of exhaust gas can be adjusted by adjusting induction efficiency of an air/fuel mixture into engine combustion chambers. For adjusting mixture gas induction efficiency, some of advanced automotive internal combustion engines employ variable cam timing technologies for advancing and retarding valve open timing with respect to top-dead-center (TDC) in the engine revolution cycle.

For example, the U.S. Pat. No. 4,535,731, proposes a valve timing control device for an internal combustion engine. The device adjusts open timing of an intake valve and/or exhaust valve of an internal combustion engine. The device includes a helical intermediate gear formed with an external helical gear teeth meshing with an internal gear teeth of an engine revolution synchronous component, such as a timing sprocket or timing pulley, and an internal gear teeth meshing with an external gear teeth of an internal gear which is rigidly connected to a camshaft. The intermediate gear is axially movable for varying rotational phase relationship between the engine revolution synchronous component and the internal gear. The axial position of the intermediate gear is adjusted hydraulically depending upon an engine driving condition so that open timing of the intake valve and/or the exhaust valve is advanced or retarded with respect to engine revolution cycle.

Such prior proposed valve timing control device is successfully in effectively adjusting valve timing. However, on the other hand, such prior proposed valve timing control device employs the helical gear teeth for adjusting the phase relationship between the rotational input torque and rotational cam drive torque. For holding accuracy in engagement between gears, it is required to obtain substantially high accuracy in production. Therefore, machining of the gears becomes difficult and costly. Furthermore, during long use, wearing and secular variation may loosen tight engagement between the gears and cause variation of the valve timing out of an optimal range.

Furthermore, since the prior proposed device is required to drive the helical intermediate gear meshing with the timing sprocket or timing pulley, and the inner gear, relatively great hydraulic and/or mechanical force is required. For reliably accepting relatively large operational force, the whole assembly of the valve timing control device necessarily becomes bulky and increases engine weight.

SUMMARY OF THE INVENTION

Therefore, it is an object of the present invention to provide a valve timing control device which is simplified in construction and can adjust the valve timing smoothly.

Another and more specific object of the invention is to provide a valve timing control device which has simply construction with reduced size and weight.

In order to accomplish aforementioned and other objects, a valve timing control device for an internal combustion engine, according to the present invention, includes an intermediate rotary component disposed between an input component which is driven in synchronism with an engine revolution, and a cam drive component which is rigidly connected to a camshaft. The intermediate component is variable of positions relative to the input and cam drive components in order to adjust phase relationship between the input component and the cam drive component for setting valve timing at optimal timing relative to engine revolution cycle. The device includes a hydraulic means which selectively locks the intermediate component at a selected position where optimal phase relationship relative to the engine driving condition is established.

According to one aspect of the invention, a valve timing control device for an internal combustion engine, comprises:

an engine synchronous rotary member driven by an engine output in synchronism with engine revolution;

a camshaft synchronous rotary member rigidly fixed to a camshaft for rotation therewith;

a first hydraulic means disposed between the engine synchronous rotary member and the camshaft synchronous rotary member for causing relative angular displacement between the engine synchronous rotary member and the camshaft synchronous rotary member in a first direction for retarding valve timing; and a second hydraulic means disposed between the engine synchronous rotary member and the camshaft synchronous rotary member for causing relative angular displacement between the engine synchronous rotary member and the camshaft synchronous rotary member in a second direction for advancing valve timing.

The first hydraulic means may include a first pressure chamber, the second hydraulic means may include a second pressure chamber, the first and second hydraulic means may be active while the fluid pressure in the associated first and second pressure chambers is in an increased level. In the preferred construction, the valve timing control device may further comprise a flow control valve means disposed between the first and second means for selectively supplying pressurized fluid to one of the first and second pressure chamber so that one of the first and second hydraulic means is selectively activated. Each of the first and second hydraulic means further comprises a thrusting member thrusting movable between an initial position and a projected position depending upon fluid pressure in associated one of first and second pressure chambers, and cam means converting hydraulic thrusting force into circumferential force for causing the relative angular displacement between the engine synchronous member and the camshaft synchronous member.

Preferably, the thrusting member in the first and second hydraulic means is hydraulically driven in axial direction and the cam means generates a circumferentially directed composite force from the hydraulic axial force. In such case, the cam means may comprise a first cam member secured on the engine synchronous member and a second cam member associated with the thrusting member which is movable toward and away from the first cam member, the first and second cam members are provided tapered surface inclining in circumferential direction. The first and second hydraulic means may have the cam members having inclination in mutually opposite circumferential directions.

Alternatively, the thrusting member may be the first and second hydraulic means is hydraulically driven in radial direction and the cam means generates a circumferentially directed composite force from the hydraulic radial force.

It is possible that the cam means includes pivotal cam member pivoted on a pivot oriented on a transverse axis, the cam member having cam face contacting with the engine synchronous member at a position offset from the transverse axis.

BRIEF DESCRIPTION OF THE DRAWINGS

The present invention will be understood more fully from the detailed description given herebelow and from the accompanying drawings of the preferred embodiment of the invention, which, however, should not be taken to limit the invention to the specific embodiment, but are for explanation and understanding only.

In the drawings.

DESCRIPTION OF THE PREFERRED EMBODIMENT

Figure 1:
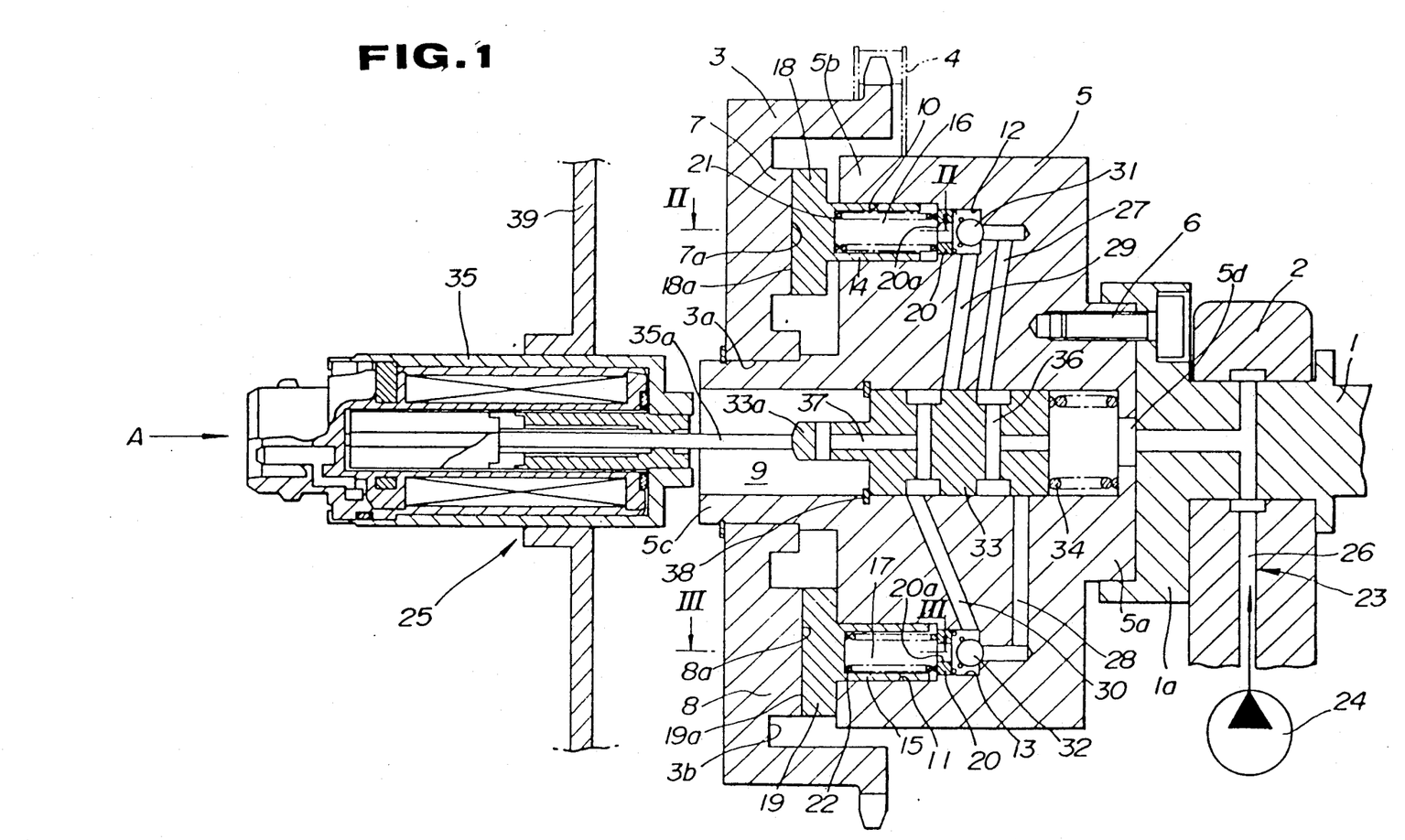
FIG. 1 is a section of the first embodiment of a valve timing control device according to the present invention.

Referring now to the drawings, particularly to FIG. 1, the first embodiment of a valve timing control system, according to the present invention, is shown in a form applied for double overhead camshaft (DOHC) type automotive internal combustion engine. Therefore, though FIG. 1 shows single camshaft which drives only one of intake valve and exhaust valve drive cams, the engine has another camshaft which drives the other of the intake and exhaust valve drive cams. It should be appreciated that the similar valve timing control device may be provided for adjusting the phase relationship of another camshaft relative to the engine revolution.

As shown in FIG. 1, a camshaft 1 is rotatably supported on a cam bearing 2 provided in a cylinder head, for rotation to drive an intake valves (not shown). As is well known, the camshaft 1 is driven by an engine output torque via a driving sprocket (not shown) rigidly fixed to an output shaft of the engine, a timing chain 4 and a timing sprocket 3. The timing sprocket 3 is thus driven in synchronism with engine revolution.

An intermediate rotary member 5 is disposed between the timing sprocket 3 and the camshaft 1. The intermediate rotary member 5 has an axially extending smaller diameter cylindrical extension 5a. The extension 5a is inserted into a recess formed at a larger diameter end section 1a of the camshaft 1. With inserting the extension 5a into the recess of the end section 1a, the intermediate rotary member 5 is rigidly fixed to the camshaft 1 for rotation therewith by means of fastening bolt 6. The intermediate rotary member 5 also has a cylindrical main body 5b and a smaller diameter extension 5c axially extending from the axial end of the main body opposite from the end from which the extension 5a is extended. The extension 5c extends through a center opening 3a of the timing sprocket 3 for rotatably supporting the timing sprocket.

Figure 2:
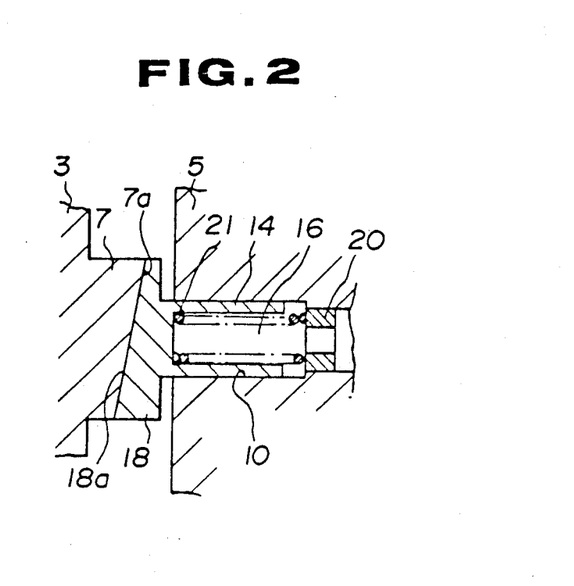
FIG. 2 is a section taken along line II—II of FIG. 1.
Figure 3:
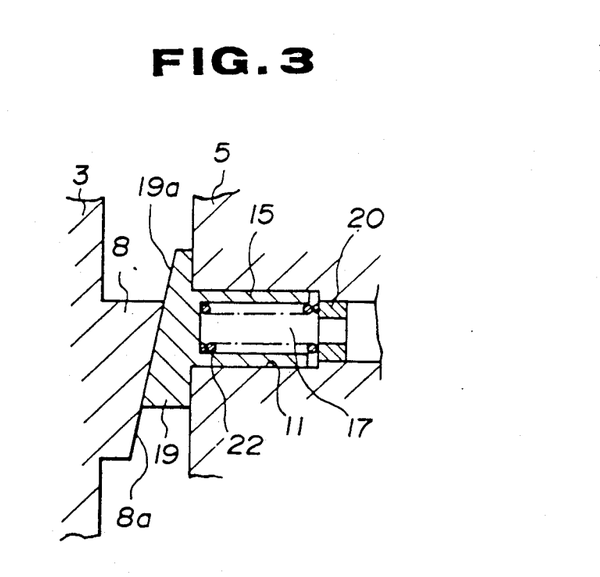
FIG. 3 is a section taken along line III—III of FIG. 1.

The timing sprocket 3 has a radially extending section 3b, on which is formed a pair of projections 7 and 8. Each of the projections 7 and 8 is formed into an essentially cylindrical configuration with a tapered end surface 7a and 8a. The tapered surfaces 7a and 8a taper mutually in opposite directions in a circumferential direction, as shown in FIGS. 2 and 3. Namely, in the shown embodiment, the projection 7 is provided with the taper surface 7a descending toward one circumferential direction. In contrast to this, the projection 8 has the taper surface 8a descending toward the other circumferential direction opposite from the descending direction of the taper surface 7a. These projections 7 and 8 extend in parallel to the center axial of the camshaft 1 from the surface of the radially extending section 3b opposing the end surface of the main body 5b of the intermediate rotary member 5.

The intermediate rotary member 5 is formed with an axially extending bore 9 which opens to the axial end of the smaller diameter section 5c. Also, the main body 5b is formed with a pair of bores 10 and 11 which open to the radial surface opposing the projections 7 and 8. The bores 10 and 11 are connected to smaller diameter bores 12 and 13 which are formed coaxially and in alignment with the bores 10 and 11. First and second plungers 14 and 15 are disposed within the bores 10 and 11. The first and second plungers 14 and 15 are formed into essentially hollow cylindrical configurations to define therein first and second pressure chambers 16 and 17.

These first and second plungers 14 and 15 are axially movable along the axes of the bores 10 and 11. The first and second plungers 14 and 15 carry plunger heads 18 and 19. The plunger heads 18 and 19 are formed into cylindrical or disc shaped configuration with tapered axial end faces 18a and 19a. The axial end faces 18a and 19a mate with the tapered end surfaces 7a and 8a.

Bias springs 21 and 22 are disposed within the first and second pressure chambers 16 and 17. The bias springs 21 and 22 are seated on the bottom of the first and second chambers at one end. On the other hand, the other ends of the bias springs 21 and 22 are seated on a ring-shaped spring seat members 20 which are pressed into the smaller diameter bores 12 and 13 and rigidly fixed therein. The spring seat members 20 are formed with center openings 20a, through which the first and second pressure chambers 16 and 17 communicate with the interior space of the smaller diameter bores 12 and 13. The bias springs 21 and 22 urges the plungers 14 and 15 toward the taper surfaces 7a and 8a of the projections 7 and 8 so as to maintain the end faces 18a and 19a of the plunger heads 18 and 19 in contact with the taper surfaces 7a and 8a of the projections 7 and 8. The spring forces of the bias springs 21 and 22 are not too strong as to prevent the axial movement of the plungers.

For controlling position of the plungers 14 and 15, a hydraulic system is provided. The hydraulic system includes a fluid pump 24 feeding pressurized working fluid through a fluid path line 23. The hydraulic system includes a flow control means for selectively supplying and draining pressurized fluid to the first and second pressure chambers 16 and 17. For switching pressurized fluid supply, an electromagnetic actuator 25 is provided, which operates a valve system built-in the intermediate rotary member 5. The hydraulic system includes a main fluid path 26 extending through the cam bearing 2. The main path 26 is communicated with annular groove 26a defined on the inner periphery of the camshaft receptacle opening of the cam bearing 2. A radial path 26b which extends radially through the camshaft 1, opens to the annular groove 26a. The radial path 26b is also communicated with an axial path 26c which extends along the center axis of the camshaft and communicates with the axially extending bore 9 via a through opening 5d formed in the smaller diameter section 5a of the intermediate rotary member 5.

A spool valve body 33 is disposed within the axially extending bore 9 for thrusting movement therealong. The spool valve defines a supply chamber 9a and a drain chamber 9b. The spool valve body 33 is formed with first and second axial valve paths 36 and 37 respectively communicating with the supply chamber 9a and the drain chamber 9b. The first and second axial valve paths 36 and 37 communicate with first and second radial paths 36a and 37a which are, in turn, communicated with circumferentially extending first and second grooves 36b and 37b formed on the outer periphery of the spool valve 33. The first and second grooves 36b and 37b are selectively communicated with essentially radial supply paths 27 and 28 and drain paths 29 and 30 which are defined through the main body 5b. The first supply path 27 and the first drain path 29 are communicated with the smaller diameter bore 12. On the other hand, the second supply path 28 and the second drain path 30 are communicated with the smaller diameter bore 13.

As can be seen from FIG. 1, the first and second supply paths 27 and 28 open at axially offset position to each so that they may communicate with the first groove 36a at different axial position of the spool valve body 33. Similarly, the first and second drain paths 29 and 30 open at axially offset position to each other to communicate with the second annular groove 37a at different axial position of the spool valve body 33. The spool valve body 33 is resiliently biased by means of a bias spring 34. The spool valve body 33 is movable first and second positions for switching fluid communication. The spring force of the bias spring 34 is exerted to normally bias the spool valve body 33 to the first position. At the first position, the spool valve body 33 abut onto a stopper ring 38 to be restricted further axial movement. At the first position which is illustrated in FIG. 1, the first supply path 27 communicates with the first groove 36a and the second drain path 30 communicates with the second groove 37a. At this condition, the pressurized fluid is supplied only to the first pressure chamber 16. At the same time, the second pressure chamber 17 is communicated with the drain chamber 9b for draining the working fluid therein. At the second position, the second supply path 28 is communicated with the supply chamber 9a via the first groove 36a and the first drain path 29 is communicated with the drain chamber 9b via the second groove 37a. At this position, the pressurized fluid is supplied to the second pressure chamber 17 and the fluid pressure in the first pressure chamber 16 is drained.

In order to operate the spool valve body 33 between the first and second positions, an electromagnetic solenoid 35 which forms a part of the electromagnetic actuator 25. The solenoid 25 is supported on the wall of the rocker cover 39. The solenoid 35 has an actuation rod 35a connected to an extension 33a of the spool valve body 33. The solenoid 35 is electrically connected to a control unit 50. The control unit 50 receives an engine load indicative signal from an engine load sensor 52 to derive a valve timing control signal on the basis of the engine load condition represented by the engine load indicative signal. In the shown embodiment, the control unit 50 derives the valve timing control signal to place the spool valve body 33 at the shown position when the engine load is smaller than or equal to a predetermined engine load criterion. On the other hand, when the engine load becomes greater than the engine load criterion, the control unit 50 derives the valve timing control signal to place the spool valve body at the second position. Practically, the valve timing control signal ordering the first position of the spool valve body 33 is low level signal to maintain the solenoid 35 in deenergized state. Then, the spool valve body 33 is maintained at the first position by the spring force of the bias spring 34. On the other hand, the valve timing control signal rises to HIGH level for ordering the second position of the spool valve body 33. Then, the solenoid 35 is energized to shifting the spool valve body 33 against the bias spring 34 to the second position.

First and second ball check valves 31 and 32 biased by means of set springs 31a and 32a are disposed between the first and second supply paths 27 and 28 and the smaller diameter bores 12 and 13. These first and second ball check valves 31 and 32 blocks surge flow of the working fluid from the pressure chambers 16 and 17 back to the supply paths.

In the practical operation, when the engine load is lower than or equal to the engine load criterion and thus the valve timing control signal is maintained LOW level, the spool valve body 33 is maintained at the first position. As a result, the fluid pressure from the oil pump 24 is introduced into the first pressure chamber 16. At the same time, the second fluid chamber 17 is connected to the drain chamber 9b to be reduced the fluid pressure therein. Therefore, for the first plunger 14, the increased fluid pressure is exerted in addition to the spring force of the bias spring 21 to cause shifting of the plunger with the plunger head 18 outwardly. Accordingly, the thrusting force as the composite force of the spring force of the bias spring and the hydraulic force of the fluid pressure in the first pressure chamber, it converted into circumferential force by the tapered interface between the tapered surfaces 7a and 18a of the projection 7 and the plunger head 18. As a result, relative angular displacement is caused between the timing sprocket 3 and the intermediate rotary member 5 in retarding direction. Therefore, while the engine load is maintained relatively low, the valve timing is maintained at retarded position. During this motion, the tapered interface between the surfaces 8a and 19a serves to convert the circumferential force into the thrusting force to cause inward movement of the plunger head 19 with the plunger 15. Since the second pressure chamber 17 is held drained, no substantial resistance against the plunger movement is exerted for permitting smooth angular displacement of the intermediate rotary member 5 and the camshaft 1 relative to the timing sprocket 3.

When the engine load is higher than the engine load criterion and thus the valve timing control signal is HIGH level, the spool valve body 33 is shifted to the second position. As a result, the fluid pressure from the oil pump 24 is introduced into the second pressure chamber 17. At the same time, the first fluid chamber 16 is connected to the drain chamber 9b to be reduced the fluid pressure therein. Therefore, for the second plunger 15, the increased fluid pressure is exerted in addition to the spring force of the bias spring 22 to cause shifting of the plunger with the plunger head 19 outwardly. Accordingly, the thrusting force as the composite force of the spring force of the bias spring and the hydraulic force of the fluid pressure in the first pressure chamber, it converted into circumferential force by the tapered interface between the tapered surfaces 8a and 19a of the projection 8 and the plunger head 19. As a result, relative angular displacement is caused between the timing sprocket 3 and the intermediate rotary member 5 in advancing direction. Therefore, while the engine load is maintained relatively high, the valve timing is maintained at advanced position. During this motion, the tapered interface between the surfaces 7a and 18a serves to convert the circumferential force into the thrusting force to cause inward movement of the plunger head 18 with the plunger 14. Since the first pressure chamber 16 is held drained, no substantial resistance against the plunger movement is exerted for permitting smooth angular displacement of the intermediate rotary member 5 and the camshaft 1 relative to the timing sprocket 3.

FIGS. 4 to 7 show the second embodiment of the valve timing control device, according to the present invention. Similarly to the former embodiment, a camshaft 101 is supported on a cam bearing 102 in rotatable fashion. The cam bearing 102 is disposed between a pair of retainer projections 101b and thus restricts axial movement of the camshaft 101 relative thereto. The camshaft 101 has an axial end portion 101a on which a timing sprocket 103 is rotatably supported. As can be seen, the timing sprocket 103 is formed into essentially dish-shaped configuration including an inner and smaller diameter cylindrical section 106a, a radial section 106b and an outer and larger diameter cylindrical section 106c. The inner cylindrical section 106a is seated on the axial end section 101a for rotation thereabout. On the other hand, the outer cylindrical section 106c is formed of sprocket teeth 107a on the outer periphery thereof. Though it is not shown, a timing chain is engaged with the sprocket teeth 107a for transmitting rotational torque of the internal combustion engine. The end of the outer cylindrical section 106c is closed by means of an essentially disc shaped cover plate 107b.

An intermediate rotary member 104 is disposed within the interior space of the timing sprocket 103. The intermediate rotary member 104 is secured at the end of the camshaft 101 by means of a fastening bolt 105 which engages with threaded bore 101b formed along the center axis of the camshaft 101 and opening to the end. The intermediate rotary member 104 is formed of an axially extending center bore 140 and a pair of radially extending bores 112a and 113a which are arranged radially symmetric orientation with respect to each other. As can be seen from FIG. 6, cylindrical guide extensions 104a and 104b are extended along the axes of the radially extending bores 112a and 113a. First and second plungers 119 and 120 are thrustingly disposed within the radially extending bores 112a and 113a. The first and second plungers 119 and 120 have round head 119a and 120a mating with the inner periphery of the outer cylindrical section 106c, and generally cylindrical body disposed within the radially extending bores 112a and 113a. Stationary cam members 108 and 109 are formed on the inner periphery of the outer cylindrical section 106c. Respective of the cam members 108 and 109 are provided cam faces 108a and 109a gradually varying projecting height level toward circumferential direction. As can be seen from FIG. 6, the ascending direction of the cam faces 108a and 109a are mutually opposite direction to each other. The round head 119a and 120a mate with the cam surfaces. The first and second plunger 119 and 120 define interior spaces 121 and 122 which serve as pressure chambers. Bias springs 129 and 130. The outer ends of the springs 129 and 130 are seated on the bottom of the interior space formed by the round heads 119a and 120a. On the other hand, the other ends of the bias springs 129 and 130 are seated on retainer blocks 117 and 118 disposed in the bores 112a and 113a. With the spring force, the round heads 119a and 120a of the first and second plungers 119 and 120 are constantly kept in contact with the cam faces 108a and 109a of the cam members 108 and 109.

Figure 6:
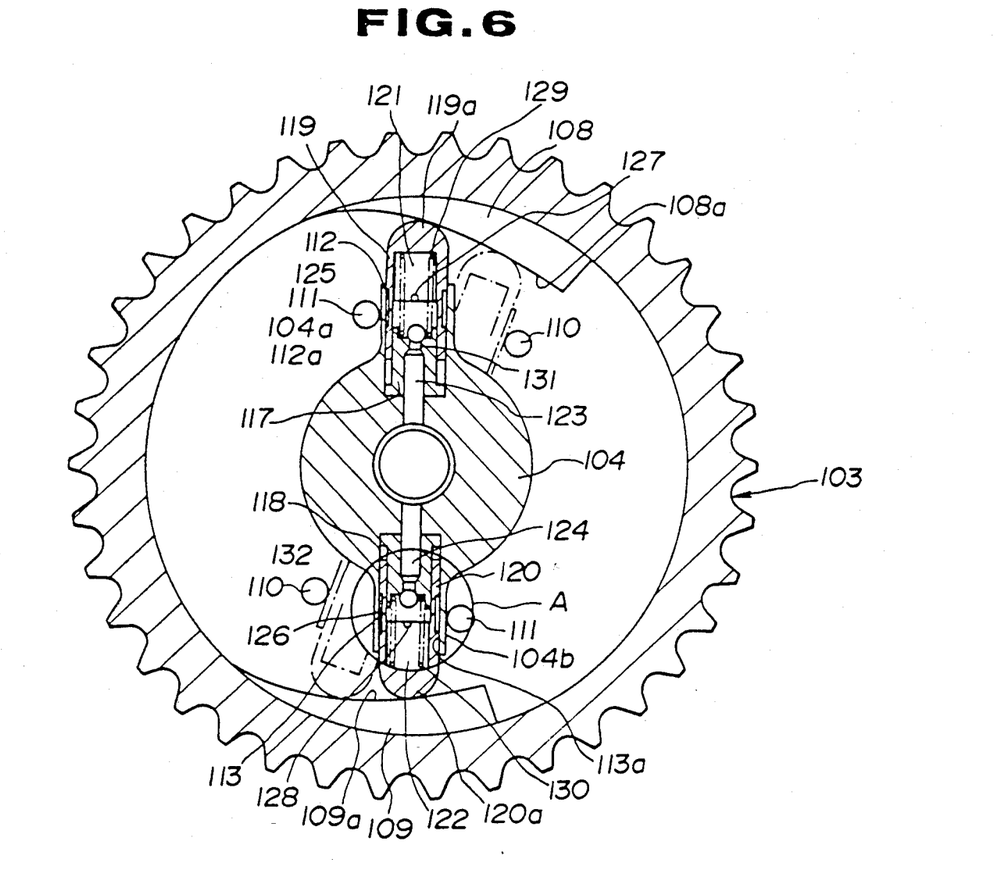
FIG. 6 is a cross section taken along line VI—VI of FIG. 5.

The bias springs 129 and 130 are set the spring force not too exert large spring force to serve for resisting against the thrusting motion of the first and second plungers 119 and 120 but only for maintaining contact between the round heads 108a and 109a and the cam faces 108 and 109. The thrusting positions of the first and second plungers 119 and 120 are determined according to the fluid pressure in the pressure chambers 121 and 122. The fluid pressure in the pressure chambers 121 and 122 are controlled by supplying and draining the pressurized fluid which is supplied from an oil pump 133. The oil pump 133 is connected to the pressure chambers 121 and 122 via hydraulic circuit.

Figure 7:
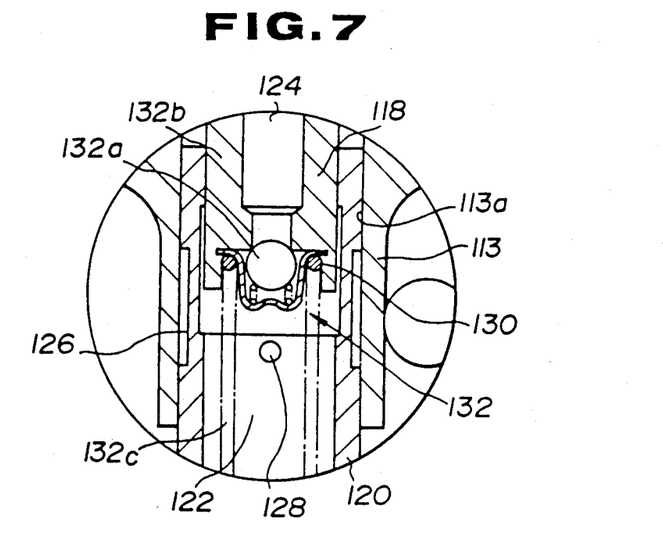
FIG. 7 is an enlarged section of a portion encircled in FIG. 6.

The hydraulic circuit includes a main path 114 extending through the cam bearing 102. The main path 114 is communicated with an annular groove 114a formed on the inner periphery of the camshaft receptacle bore of the cam bearing. To this annular groove 114a, a radial paths 134 is communicated at the outer ends thereof. The radial paths 134 are formed radially through the camshaft 101. The inner end of the radial paths 134 is communicated with an axially extending annular path 135 defined between the axial bore 101b of the camshaft and the fastening bolt 105 which rigidly secures the intermediate rotary member 104. The annular path 135 further extends through the center bore 104a of the intermediate rotary member 104. The annular path 135 is communicated with the first and second pressure chambers 121 and 122 via radial paths 123 and 124 extending through the intermediate rotary body and the retainer blocks 117 and 118 and via one-way check valves 131 and 132. As shown in FIG. 7, the one-way check valve 132 includes a ball-shaped valve body 132a retained on the outlet of the radial path 123 and 124 by means of a spring seat members 132b and a coil springs 132c. The spring seat member is formed of a recess 132d to which a stopper pin 128 engages for restricting inward movement of the plungers 119 and 120. The first and second pressure chambers 121 and 122 are, in turn, connected to the interior space 106d via drain paths 138 and 139 defined through the intermediate rotary member 104 and radial paths 136 and 137. The radial paths 136 and 137 are, in turn, connected to a valve bore 140 which opens to the interior space 106d. A thrusting valve body 142 is disposed within the valve bore 140 for selectively establishing fluid communication between the valve bore 140 and the pressure chambers 121 and 122. Namely, when the thrusting valve body 142 is placed at the position illustrated in FIG. 4, the second pressure chamber 122 is communicated with the valve bore 140 via the radial path 137 via an axial path 142b. The thrusting valve body 142 is normally biased to the bias spring 143. On the other hand, when the thrusting valve body 142 is forced toward the bottom of the valve bore 140, the pressure chamber 121 is communicated with the valve bore via the radial path 136, as shown in FIG. 5.

Figure 4:
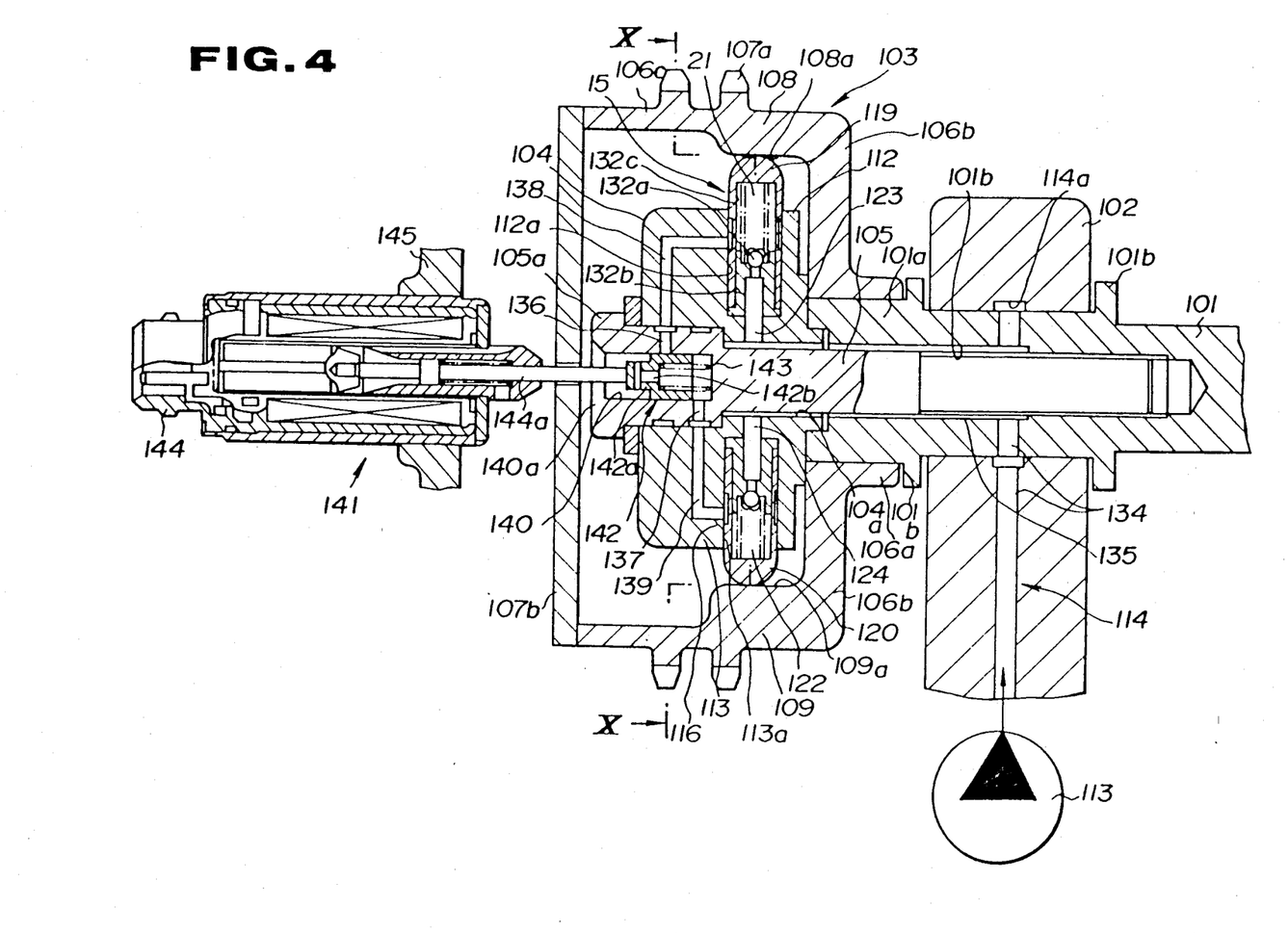
FIG. 4 is a section of the second embodiment of a valve timing control device according to the present invention.
Figure 5:
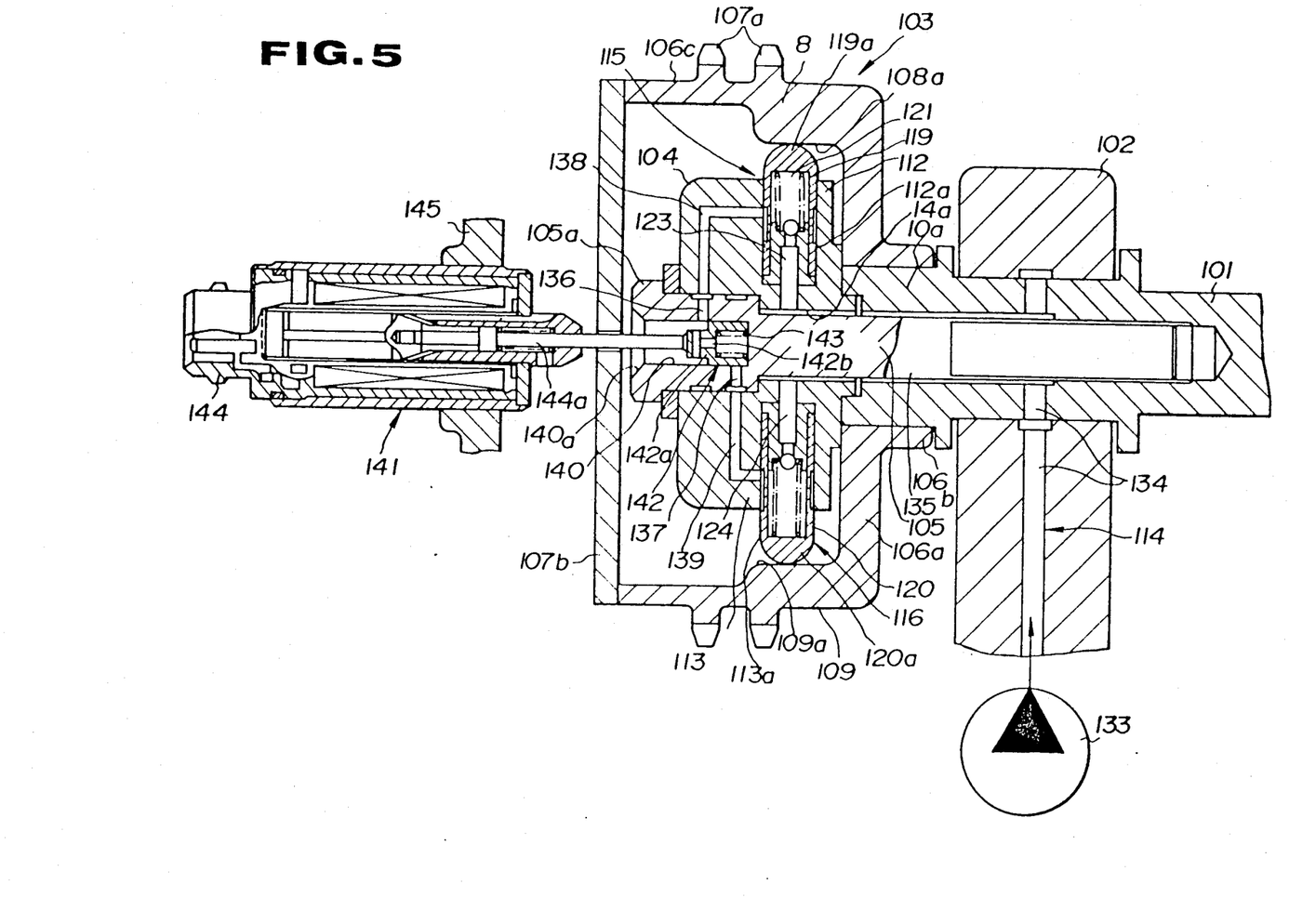
FIG. 5 is a section similar to FIG. 4, but showing position establishing phase relationship between a timing sprocket and a camshaft different from the position in FIG. 4.

In order to control the valve position between the positions illustrated in FIGS. 4 and 5, an actuator assembly 141 employing an electromagnetic solenoid 144 is used. The actuator assembly 141 is mounted on the rocker cover 145. The actuator assembly 141 has an actuation rod 144a connected to a smaller diameter end section 140a of the thrusting valve body 140. As discussed in the former embodiment, the actuator 144 is connected to a control unit so that the valve body can be driven between the positions of FIGS. 4 and 5.

In the shown construction, when the actuator 144 is deenergized, the thrusting valve body 142 is positioned at the position in FIG. 4. Therefore, the pressurized fluid from the oil pump 133 supplied though the annular chamber 135 and the radial path 124 is drained through the drain path 137 and the valve bore 140. At this valve position, the fluid pressure chamber 121 is blocked from the valve bore 140 so as to accumulate the pressurized fluid interdicted thereinto. Therefore, the fluid pressure in the first pressure chamber 121 is increased for urging the first plunger 119 outwardly. At this time, since the round head 199a of the first plunger 119 is in contact with the tapered or sloped cam face 108a, the force acting on the interface point is splitted into the radial component and the circumferential component. The circumferential component of the force acting at the interface point causes relative angular displacement of the rotary intermediate member 104 relative to the timing sprocket 103 in counterclockwise direction. Magnitude of the relative angular displacement in the counterclockwise direction is restricted by stopper projections 111 as illustrated by solid line in FIG. 6.

On the other hand, when the actuator 144 is energized, the thrusting valve body 142 is placed at the position illustrated in FIG. 5. As can be appreciated, at this position, the second pressure chamber 122 is blocked the fluid communication with the valve bore 140 and the first pressure chamber 121 is communicated with the valve bore via the drain path 138. Therefore, the fluid pressure in the second pressure chamber 122 is increased to urge the second plunger 120 outwardly. Therefore, the intermediate rotary member 104 is caused angular displacement relative to the timing sprocket 103 for causing rotational phase shift between the timing sprocket 103 and the camshaft 101.

The construction of the second embodiment set forth above can be advantageously introduced for requiring much shorter axial length of the valve timing control device in comparison with that illustrated in the former embodiment.

FIGS. 8 to 11 show the third embodiment of the valve timing control system according to the present invention. In this embodiment, a camshaft 201 is rotatably supported on a cam bearing 202. A timing sprocket 203 is rotatably supported on the axial end of the camshaft 201 for rotation thereabout. An intermediate rotary member 204 is rigidly mounted on the axial end of the camshaft 201 by means of a fastening bolt 210. First and second cam members 215 and 216 are pivotally mounted on the intermediate rotary member 204 by means of brackets 211 and 212 for pivotal movement about pivots 213 and 214. The first and second cam members 215 and 216 have circumferential cam faces 215a and 216a respectively opposing against the inner periphery of outer cylindrical section 205d which forms the timing sprocket with an inner cylindrical section 205c and a radial section 205b. Sprocket teeth 205a are formed on the outer periphery of the outer cylindrical section 205d. As can be seen from FIG. 10, the cam members 215 and 216 are so oriented for pivoting about the pivots 213 and 214 oriented in alignment on a transverse axis P extending through the center. The cam faces 215a and 216a are so designed as to contact with the inner periphery 207a of the outer cylindrical section 205d of the timing sprocket 203 at circumferentially off-set positions with respect to the transverse axis P. The first and second cam members 215 and 216 have extensions 219 and 220 extending at the opposite side to the contact points with the inner periphery of the timing sprocket 203 with respect to the transverse axis P. Actuation rods 227 and 228 are connected to the extensions 219 and 220 at the outer ends thereof. In order to retain the extensions 219 and 220, retainer extensions 229 and 230 are provided on the actuation rods 227 and 228. The inner ends of the actuation rods 227 and 228 are connected to pistons 225 and 226 disposed in first and second pressure chambers 221a and 222a which are defined in the intermediate rotary member 204. The outer open ends of the first and second pressure chambers 221a and 222a are closed by closures 223 and 224 which have cylindrical guides 223a and 224a. Bias springs 231 and 232 are disposed between the pistons 225 and 226 and the closures 223 and 224 for biasing the pistons inwardly.

Figure 10:
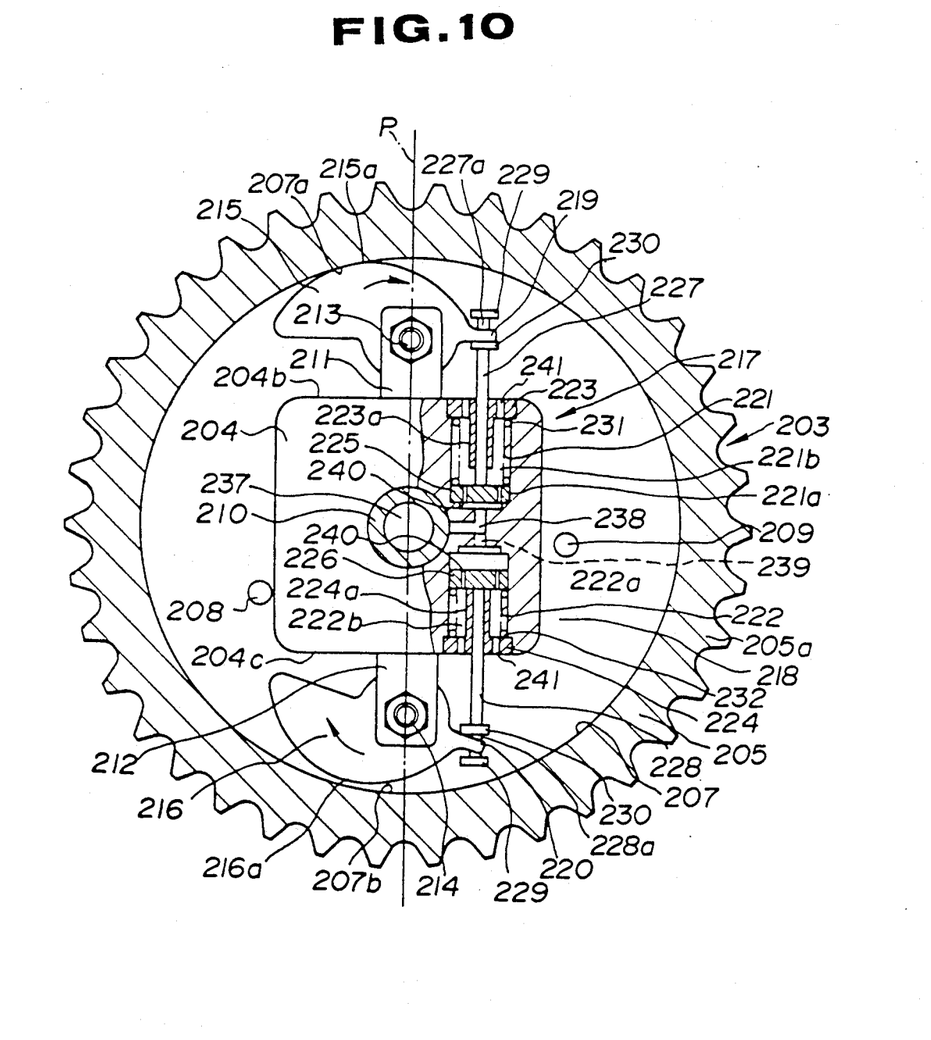
FIG. 10 is a cross section taken along line X—X of FIG. 9.
Figure 11:
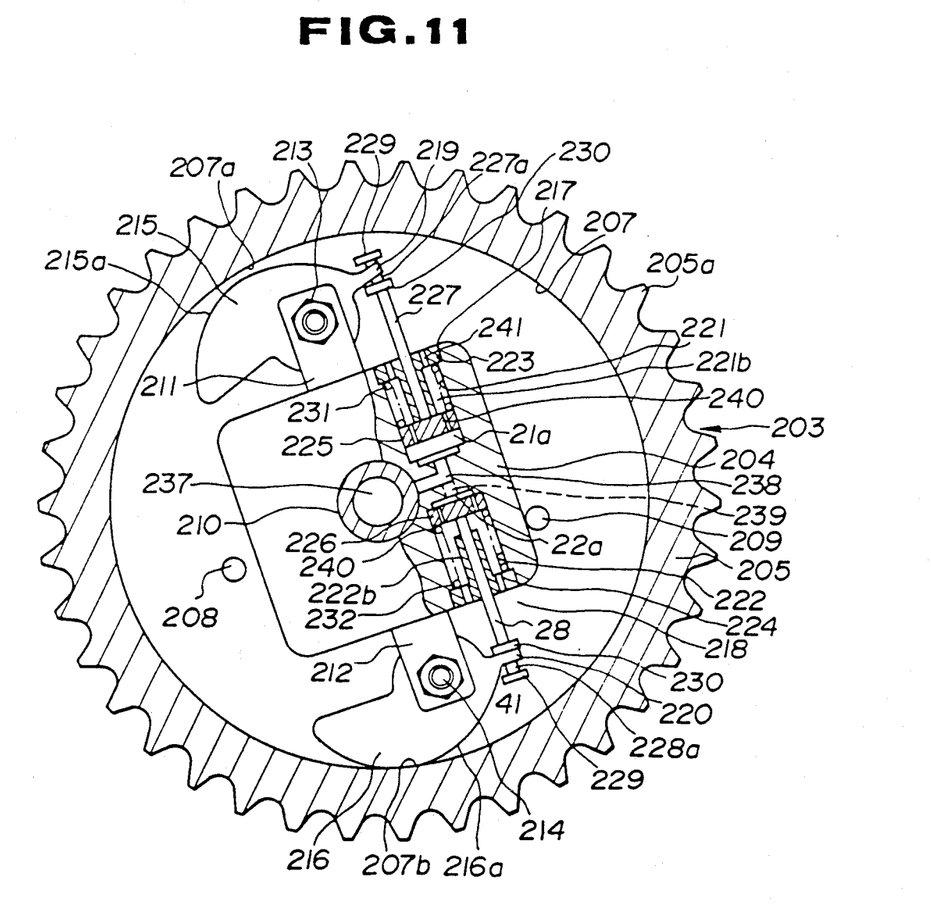
FIG. 11 is a similar cross section to FIG. 10 but showing different position to FIG. 10.

As seen from FIG. 10, the pistons 225 and 226 are formed with flow restriction orifices 240. The flow restriction orifices 240 establishes fluid flow from the first and second pressure chambers 221a and 222a and drain chambers 221b and 222b. The drain chambers 221b and 222b are communicated with the interior space of the timing sprocket 203 via the flow restriction orifices 241. The flow restriction orifices 240 and 241 permits limited amount of fluid flow therethrough. On the other hand, a hydraulic circuit is provided for supplying pressurized fluid. The hydraulic circuit includes a main path 233 extending through the cam bearing 202, a radial path 235 formed transversely through the camshaft 201, an axial path 236 formed through the fastening bolt 210, a valve bore 210a defined in the fastening bolt, supply paths 238 and 239. For selectively connecting the valve bore 210a and one of the first and second pressure chambers 221a and 222a, a thrusting valve body 243 is provided within the valve bore for thrusting movement. The thrusting valve body 243 has a cylindrical body 243a, in which is disposed a bias spring 244. At the shown position in FIG. 8, the valve member establishes the fluid communication between the valve bore 210a and the second pressure chamber 222a via the supply line 239. On the other hand, at the position in which the thrusting valve member 243 is shifted inwardly, the fluid communication between the first pressure chamber 221a and the valve bore 210a is established via the first supply line 238. As seen from FIG. 8, the thrusting valve member 243 is connected to an actuator assembly 242 which includes an electromagnetic solenoid 245. The actuator assembly is supported on a rocker cover 246.

Figure 8:
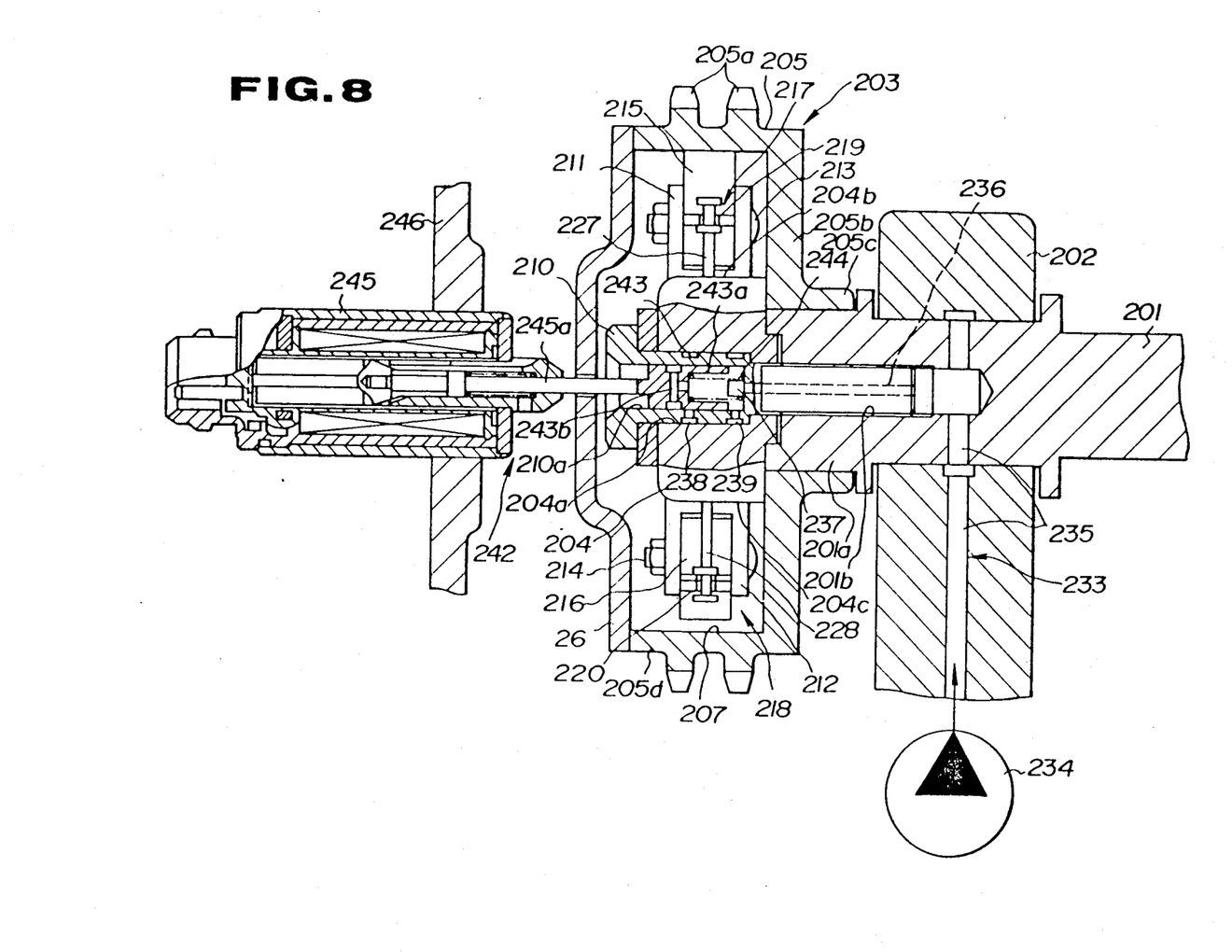
FIG. 8 is a section of the second embodiment of a valve timing control device according to the present invention.
Figure 9:
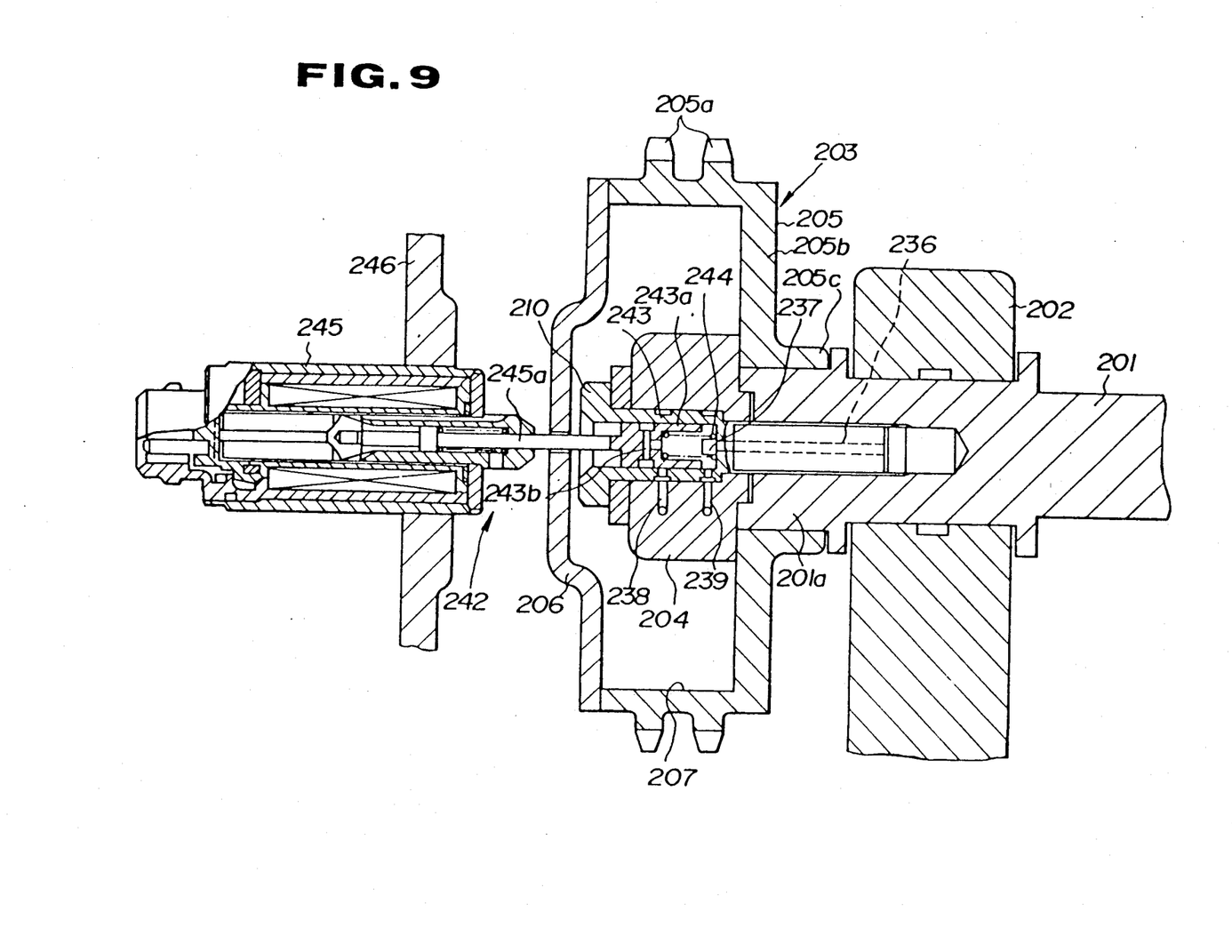
FIG. 9 is a section similar to FIG. 8, but showing position establishing phase relationship between a timing sprocket and a camshaft different from the position in FIG. 8.

When the thrusting valve 243 is placed at the shown position, the fluid pressure in the second pressure chamber 222a is increased to push the actuation rod 227 with the piston 225 outwardly for shifting the cam surface 215a of the cam member 215 away from the inner periphery 207a of the timing sprocket 207. At the same time, since the first pressure chamber 221 is blocked from the fluid communication from the valve bore 210a, the fluid pressure in the first pressure chamber is maintained low. Therefore, the piston 226 with the actuation rod 228 is shifted inwardly by the spring force of the bias spring 232. As a result, the cam face 216a of the cam member 216 is comes into contact with the inner periphery 207b of the timing sprocket 203. As a result, the intermediate rotary member 204 is rotatingly driven until the outer periphery thereof comes into contact with a stopper pin 209. On the other hand, when the valve member 243 is shifted inwardly, the fluid pressure in the first pressure chamber 221a is increased to release the cam face 216a from the mating periphery 207b of the timing sprocket and the fluid pressure in the second pressure chamber is decreased to drive the cam member 215 to contact the cam face 215a onto the mating surface 207a. Therefore, the intermediate rotary member 204 is driven in the direction opposite to the former case until the outer periphery thereof comes into contact with a stopper pin 208. Therefore, phase relationship between the timing sprocket and the camshaft can be effectively adjusted.

Therefore, the present invention fulfills all of the objects and advantages sought therefor.

While the present invention has been discussed in detail in terms of the preferred embodiment of the invention, the invention should be appreciated that the invention can be embodies in various ways. Therefore, the invention should be understood to include all possible embodiments and modifications which can be implemented without departing from the principle of the invention.

What is claimed is:

1. A valve timing control device for an internal combustion engine, comprising:
   an engine synchronous rotary member driven by an engine output in synchronism with engine revolution;
   a camshaft synchronous rotary member rigidly fixed to a camshaft for rotation therewith;
   a first hydraulic means disposed between said engine synchronous rotary member and said camshaft synchronous rotary member for causing relative angular displacement between said engine synchronous rotary member and said camshaft synchronous rotary member in a first direction for retarding valve timing;
   a second hydraulic means disposed between said engine synchronous rotary member and said camshaft synchronous rotary member for causing relative angular displacement between said engine synchronous rotary member and said camshaft synchronous rotary member in a second direction for advancing valve timing;
   a common fluid pressure supply path connected commonly to said first and second hydraulic means for supplying pressurized fluid from a fluid pressure source means; and
   a drain path independently of said common fluid pressure supply path and in common to said first and second hydraulic means for draining the pressurized working fluid, said drain path incorporating an electromagnetically operable valve means for selectively establishing and blocking fluid communication between said first and second hydraulic means and said drain path for selectively activating one of said first and second hydraulic means.

2. A valve timing control device as set forth in claim 1, wherein said first hydraulic means includes a first pressure chamber, said second hydraulic means includes a second pressure chamber, said first and second hydraulic means are active while the fluid pressure in the associated first and second pressure chambers is in an increased level.

3. A valve timing control device as set forth in claim 2, which further comprises a flow control valve means disposed between said first and second means for selectively supplying pressurized fluid to one of said first and second pressure chamber so that one of said first and second hydraulic means is selectively activated.

4. A valve timing control device as set forth in claim 3, wherein each of said first and second hydraulic means further comprises a thrusting member movable between an initial position and a projected position depending upon fluid pressure in associated one of first and second pressure chambers, and cam means converting hydraulic thrusting force into circumferential force for causing said relative angular displacement between said engine synchronous member and said camshaft synchronous member.

5. A valve timing control device as set forth in claim 4, wherein said thrusting member in said first and second hydraulic means is hydraulically driven in axial direction and said cam means generates a circumferentially directed composite force from the hydraulic axial force.

6. A value timing control device for an internal combustion engine, comprising:

an engine synchronous rotary member driven by an engine output in synchronism with engine revolution;

a camshaft synchronous rotary member rigidly fixed to a camshaft for rotation therewith;

a first hydraulic means disposed between said engine synchronous rotary member and said camshaft synchronous rotary member for causing relative angular displacement between said engine synchronous rotary member and said camshaft synchronous rotary member in a first direction for retarding valve timing;

a second hydraulic means disposed between said engine synchronous rotary member and said camshaft synchronous rotary member for causing relative angular displacement between said engine synchronous rotary member and said camshaft synchronous rotary member in a second direction for advancing valve timing;

said first hydraulic means including a first pressure chamber, said second hydraulic means including a second pressure chamber, said first and second hydraulic means being active while the fluid pressure in the associated first and second pressure chamber is in an increased level;

a flow control valve means disposed between said first and second means for selectively supplying pressurized fluid to one of said first and second pressure chamber so that one of said first and second hydraulic means is selectively activated; and each of said first and second hydraulic means including a thrusting member for thrusting movement between an initial position and a projected position depending upon fluid pressure in the associated one of said first and second hydraulic means, and a cam means converting hydraulic thrusting force into circumferential force for causing said relative angular displacement between said engine synchronous member and said camshaft synchronous member, said thrusting member in said first and second hydraulic means being hydraulically driven in an axial direction and said cam means generating a circumferentially directed composite force from the hydraulic axial force, and said cam means comprising a first cam member secured on said camshaft synchronous member and a second cam member associated with said thrusting member which is movable toward and away from said first cam member, said first and second cam members being provided with a tapered surface inclining in a circumferential direction.

7. A valve timing control device as set forth in claim 6, said first and second hydraulic means have said cam members having inclination in mutually opposite circumferential directions.

8. A valve timing control device as set forth in claim 4, wherein said thrusting member is said first and second hydraulic means being hydraulically driven in radial direction and said cam means generates a circumferentially directed composite force from the hydraulic radial force.

9. A valve timing control device for an internal combustion engine, comprising:

an engine synchronous rotary member driven by an engine output in synchronism with engine revolution;

a camshaft synchronous rotary member rigidly fixed to a camshaft for rotation therewith;

a first hydraulic means disposed between said engine synchronous rotary member and said camshaft synchronous rotary member for causing relative angular displacement between said engine synchronous rotary member and said camshaft synchronous rotary member in a first direction for retarding valve timing;

a second hydraulic means disposed between said engine synchronous rotary member and said camshaft synchronous rotary member for causing relative angular displacement between said engine synchronous rotary member and said camshaft synchronous rotary member in a second direction for advancing valve timing;

said first hydraulic means including a first pressure chamber, said second hydraulic means including a second pressure chamber, said first and second hydraulic means being active while the fluid pressure in the associated first and second pressure chamber is in an increased level;

a flow control valve means disposed between said first and second means for selectively supplying pressurized fluid to one of said first and second pressure chambers so that one of said first and second hydraulic means is selectively activated; and each of said first and second hydraulic means including a thrusting member for thrusting movement between an initial position and a projected position depending upon fluid pressure in the associated one of said first and second hydraulic means, and a cam means converting hydraulic thrusting force into circumferential force for causing said relative angular displacement between said engine synchronous member and said camshaft synchronous member, said thrusting member in said first and second hydraulic means being hydraulically driven in a radial direction and said cam means generating a circumferentially directed composite force from said hydraulic radial force, said cam means including a pivotal cam member pivoted on a pivot oriented on a transverse axis, said cam member having a cam face contacting with said engine synchronous member at a position offset from said transverse axis.

10. A valve timing control device for an internal combustion engine, comprising:

an engine synchronous rotary member driven by an engine output in synchronism wwith engine revoluution;

a camshaft synchronous rotary member rigidly fixed to a camshaft for rotation therewith;

a first hydraulic means disposed between said engine synchronous rotary member and said camshaft synchronous rotary member for causing relative angular displacement between said engine synchronous rotary member and said camshaft synchronous rotary member in a first direction for retarding valve timing;

a second hydraulic means disposed between said engine synchronous rotary member and said camshaft synchronous rotary member for causing relative angular displacement between said engine synchronous rotary member and said camshaft synchronous rotary member in a second direction for advancing valve timing; and each of said first and second hydraulic means including a thrusting member for thrusting movement between an initial position and a projected position depending upon fluid pressure in the associated one of said first and second hydraulic means, and a cam means converting hydraulic thrusting force into circumferential force for causing said relative angular displacement between said engine synchronous member and said camshaft synchronous member, said thrusting member in said first and second hydraulic means being hydraulically driven in an axial direction and said cam means generating a circumferentially directed composite force from the hydraulic axial force, and said cam means comprising a first cam member secured on said camshaft synchronous member and a second cam member associated with said thrusting member which is movable toward and away from said first cam member, said first and second cam member being provided with a tapered surface inclinding in a circumferential direction.

11. A valve timing control device for an internal combustion engine, comprising:
   an engine synchronous rotary member driven by an engine output in synchronism with engine revolution;
   a camshaft synchronous rotary member rigidly fixed to a camshaft for rotation therewith;
   a first hydraulic means disposed between said engine synchronous rotary member and said camshaft synchronous rotary member for causing relative angular displacement between said engine synchronous rotary member and said camshaft synchronous rotary member a first direction for retarding valve timing;
   a second hydraulic means disposed between said engine synchronous rotary member and said camshaft synchronous rotary member for causing relative angular displacement between said engine synchronous rotary member and said camshaft synchronous rotary member in a second direction for advancing valve timing; and
   each of said first and second hydraulic means including a hydraulically driven thrusting means and a pivotal cam means drivingly connected to said thrusting means, said cam means including a pivotal cam member pivoted on a pivot oriented on a transverse axis, said cam member having a cam contacting with said engine synchronous member at a position offset from said transverse axis.

12. A valve timing control device for an internal combustion engine, comprising:
   an engine synchronous rotary member driven by an engine output in synchronism with engine revolution;
   a camshaft synchronous rotary member rigidly fixed to a camshaft for rotation therewith;
   a first hydraulic means disposed between said engine synchronous rotary member and said camshaft synchronous rotary member for causing relative angular displacement between said engine synchronous rotary member and said camshaft synchronous rotary member in a first direction for retarding valve timing;
   a second hydraulic means disposed between said engine synchronous rotary member and said camshaft synchronous rotary member for causing relative angular displacement between said engine synchronous rotary member and said camshaft synchronous rotary member in a second direction for advancing valve timing;
   a common fluid pressure supply path connected commonly to said first and second hydraulic means for supplying pressurized fluid from a fluid pressure source means;
   a drain path independent of said common fluid pressure supply path and in common to said first and second hydraulic means for draining the pressurized working fluid, said drain path incorporating an electromagnetically operable valve means for selectively establishing and blocking fluid communication between said first and second hydraulic means and said drain path for selectively activating one of said first and second hydraulic means, and
   each of said first and second hydraulic means incorporating a spring loaded cam member for interaction with said engine synchronous rotary member for establishing interlocking between said engine synchronous rotary member and said camshaft synchronous rotary member at selected advanced and retard positions, said spring force being selected to be insufficient for causing phase shift between said engine synchronous rotary member and said camshaft synchronous rotary member.

* * * * *